(12) United States Patent
DeCusatis et al.

(10) Patent No.: US 8,917,736 B2
(45) Date of Patent: Dec. 23, 2014

(54) UNIFIED SYSTEM NETWORKING WITH PCIE-CEE TUNNELING

(71) Applicant: International Business Machines Corporation, Armonk, NY (US)

(72) Inventors: Casimer M. DeCusatis, Poughkeepsie, NY (US); Rajaram B. Krishnamurthy, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 177 days.

(21) Appl. No.: 13/720,240

(22) Filed: Dec. 19, 2012

(65) Prior Publication Data

US 2014/0169380 A1 Jun. 19, 2014

(51) Int. Cl.
| | | |
|---|---|---|
| *H04L 12/28* | (2006.01) | |
| *H04L 12/721* | (2013.01) | |
| *H04L 12/46* | (2006.01) | |
| *G06F 13/366* | (2006.01) | |

(52) U.S. Cl.
CPC ............ *H04L 45/66* (2013.01); *H04L 12/4633* (2013.01); *G06F 13/366* (2013.01)
USPC .......................................................... 370/401

(58) Field of Classification Search
None
See application file for complete search history.

(56) References Cited

U.S. PATENT DOCUMENTS

| | | |
|---|---|---|
| 2008/0270599 A1 | 10/2008 | Tamir |
| 2009/0161692 A1 | 6/2009 | Hirata et al. |
| 2010/0061383 A1* | 3/2010 | Rupanagunta et al. ....... 370/401 |
| 2011/0058573 A1 | 3/2011 | Balakavi et al. |
| 2011/0206051 A1 | 8/2011 | Suzuki |
| 2011/0219164 A1 | 9/2011 | Suzuki et al. |
| 2011/0243134 A1* | 10/2011 | Armstrong et al. ........... 370/392 |
| 2012/0106558 A1* | 5/2012 | Dickens et al. ............... 370/401 |

FOREIGN PATENT DOCUMENTS

CN 1954574 A1 4/2007

OTHER PUBLICATIONS

Emerick, R.; "PCI Express Impact on Storage Architectures and Future Data Centers", Oracle Corporation; www.snia.org/sites/default/.../Emerickron_PCI..; 2011.
Hewlett-Packard; "Quick Specs—HP Virtual Connect FlexFabric", h18004.www1.hp.com/products/quickspecs/13652-div..; Dec. 2011.
S. Krishnan et al, "Security Concerns with IP Tunneling", http://priorartdatabase.com/IPCOM/000206334; Apr. 1, 2011.

* cited by examiner

*Primary Examiner* — Otis L Thompson, Jr.
(74) *Attorney, Agent, or Firm* — Steven Chiu (57) ABSTRACT

Peripheral Component Interconnect Express (PCIe) tunneling over Converged Enhanced Ethernet (CEE) networks. The CEE networks comprise devices configured to use PCIe. An initiating device initiates a command. The command is associated with initiator control signals, which are associated with the initiating device. The initiating device requests permission from an arbiter, and receives a request grant from the arbiter. Based on the request grant, a mapping device maps the initiator control signals, an target device address, and the command into a CEE control frame. Based on the mapping, the initiating device transmits an inquiry to the devices. Based on transmitting the inquiry, the initiating device receives a response from a corresponding device. The corresponding device is associated with the target device address. The response comprises target control signals associated with the corresponding device. Based on the response, the initiating device initiates a transaction to the corresponding device through CEE control frames.

14 Claims, 9 Drawing Sheets

FIG.1

| PREAMBLE 7 BYTES | START OF FRAME DELIMITER 1 BYTES | DESTINATION MAC ADDRESS 6 BYTES | SOURCE MAC ADDRESS 6 BYTES | LENGTH 2 BYTES | TYPE 2 BYTES | PAYLOAD 46-1500 BYTES | FRAME CHECK SEQUENCE 4 BYTES |
|---|---|---|---|---|---|---|---|
| 201 | 202 | 203 | 204 | 205 | 206 | 207 | 208 |

| FRAME # | IRDY# | DEVSEL# | TRDY# | STOP# | REQ# | GNT# | TARGET ADDRESS OR IDLES | DATA PAYLOAD |
|---|---|---|---|---|---|---|---|---|
| 301 | 302 | 303 | 304 | 305 | 306 | 307 | 308 | 309 |

UNIFIED SYSTEM NETWORKING WITH PCIE-CEE TUNNELING

BACKGROUND

The present invention relates, in general, to computer system networking, and in particular, to system networking with tunneling.

Most modern computer systems use the Peripheral Component Interconnect Express (PCIe) bus as a standard interconnect with network adapter cards, for example in the backplane of a computer system. However, PCIe bus data rates are being overtaken by data rates for lossless Ethernet, also known as Converged Enhanced Ethernet (CEE).

BRIEF SUMMARY

The present invention relates, in general, to computer system networking, and in particular, to system networking with tunneling. According to one embodiment of the present invention, a method, system, and program product is provided for Peripheral Component Interconnect Express (PCIe) tunneling over Converged Enhanced Ethernet (CEE) networks. The CEE networks comprise a one or more devices configured to use PCIe. An initiating device initiates a command. The command is associated with one or more initiator control signals. The one or more initiator control signals are associated with the initiating device. The initiating device requests permission from an arbiter. The initiating device receives a request grant from the arbiter. Based on the request grant, a mapping device associated with the initiating device maps the one or more initiator control signals, an address of a target device, and the command into a CEE control frame. Based on the mapping, the initiating device transmits an inquiry to the one or more devices. Based on transmitting the inquiry, the initiating device receives a response from a corresponding device from the one or more devices. The corresponding device is associated with the address of the target device. The response comprises one or more target control signals associated with the corresponding device. Based on the response, the initiating device initiates a transaction to the corresponding device through one or more of the CEE control frames.

According to one embodiment of the present invention, wherein initiating, by the initiating device, a transaction further comprises the following. Based on the command being a write command, the initiating device transmits one or more write command associated CEE control frames to the corresponding device. The one or more write command associated CEE control frames comprise data corresponding to the write command. Based on the command being a read command, the initiating device receives one or more read command associated CEE control frames from the corresponding device. The one or more read command associated CEE control frames comprise data corresponding to the read command.

According to one embodiment of the present invention, wherein initiating, by the initiating device, a transaction further comprises the following. Based on the command being a read command, transmitting, by the corresponding device, one or more read command associated CEE control frames to the initiating device. The one or more read command associated CEE control frames comprise data corresponding to the read command. Based on the command being a write command, receiving, by the corresponding device, one or more write command associated CEE control frames from the initiating device. The one or more write command associated CEE control frames comprise data corresponding to the write command.

According to one embodiment of the present invention, further comprising receiving, by a receiving device from the one or more devices, the inquiry. The inquiry comprises the address of the target device. Based on the inquiry, the receiving device checks to see if the receiving device is associated with the address of said target device. Based on the receiving device being associated with the address of the target device, the receiving device transmits the response to the initiating device. The receiving device is said corresponding device.

According to one embodiment of the present invention, wherein mapping, by a mapping device associated with a initiating device, the one or more initiator control signals, an address of a target device, and the command into a CEE control frame further comprises the following. The mapping device maps a delay and a request signal into the CEE control frame According to one embodiment of the present invention, wherein the inquiry is transmitted through the CEE control frame.

According to one embodiment of the present invention, wherein the CEE control frame comprises a header and a payload. The header identifies the CEE control frame as PCIe. The payload comprises five control signal fields corresponding to the initiator control signals and target control signals.

According to one embodiment of the present invention, wherein the initiating device permanently asserts a timer initiator control signal to avoid a master abort.

According to one embodiment of the present invention, wherein the arbiter permanently parks the grant signal for the initiating device when dealing with a long distance target device.

According to one embodiment of the present invention, wherein a mapping device associated with said corresponding device is configured to map PCIe control signals associated with said corresponding device, data associated with said corresponding device, or a combination thereof into a CEE frame and to transmit said CEE frame to said initiating device.

DETAILED DESCRIPTION

In accordance with an embodiment, a method, system, and computer program product is provided for tunneling over a network, in particular Peripheral Component Interconnect Express (PCIe) tunneling over Converged Enhanced Ethernet (CEE) networks. PCIe is defined by the PCIe base specification, which may be found in "PCI Express® Base Specification Revision 3.0 Version 0.9" published Aug. 10, 2010, incorporated herein by reference. CEE is defined by the lossless Ethernet spec from the IEEE, which may be found in "IEEE Standard for Information technology-Specific requirements—Part 3: Carrier Sense Multiple Access with Collision Detection (CSMA/CD) Access Method and Physical Layer Specifications" published Jun. 22, 2010, reference number IEEE 802.3™-2008, incorporated herein by reference. The term data and information may be used interchangeably throughout the specification. The term initiator, initiator device, and initiating device may be used interchangeably throughout the specification. The term target and target device may be used interchangeably throughout the specification. The term frame and packet may be used interchangeably throughout the specification. The term lossless Ethernet frame and CEE frame may be used interchangeably throughout the specification.

Figure 1:
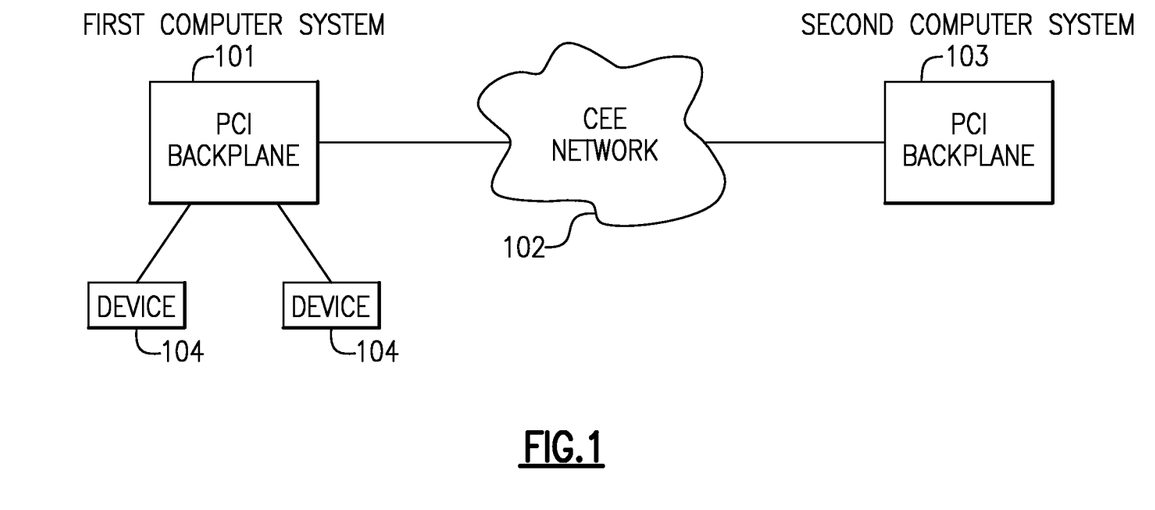
FIG. 1 illustrates one embodiment of a computer network in accordance with one or more aspects of the present invention.

One embodiment of a computer network in accordance with one or more aspects of the present invention is described in reference to FIG. 1. A first computer system 101 is connected to multiple devices 104, as well as across a network 102 to a second computer system 103. The network may be a CEE network. The network 102 comprises one or more switches. The second computer system 103 may be connected to multiple devices 105. In one embodiment, the second computer system 103 may be seen by the first computer system 101 as if it was one of the attached devices 104. In one embodiment, the first computer system 101 may see all devices 105 and the second computer system 103 as a single device. In one embodiment, the first computer system 101 may connect to the network through the use of a network interface controller (NIC), which may be internal or external to the computer system itself. The NIC may be connected to the devices 104 through a bus, such as a PCIe bus. In one embodiment, the second computer system 103 may connect to the network 102 through the use of a NIC which may be internal or external to the computer system itself as well. The second computer system NIC may be connected through the devices 105 through a bus, such as a PCIe bus. Transmissions from one computer system to the other may be sent through one or more data frames, for example a lossless Ethernet frame. In one embodiment, the first computer system 101 may have a backplane that uses a PCIe bus to connect the first computer system devices 104. In one embodiment, the second computer system 103 may have a backplane that uses a PCIe bus to connect with second computer system devices 105. For example, the PCIe bus may be a PCIe gen 3 bus, which is an 8 Gigabits per second serial bidirectional bus, where the 8 Gigabits per second is the nominal data rate.

Figure 2:
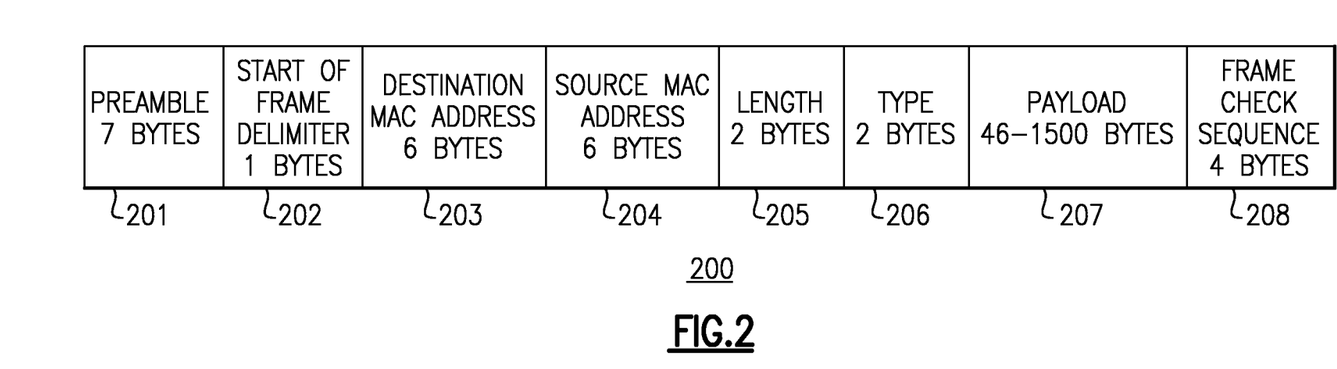
FIG. 2 illustrates one embodiment of a lossless Ethernet frame in accordance with one or more aspects of the present invention.

One embodiment of a lossless Ethernet frame in accordance with one or more aspects of the present invention is described with reference to FIG. 2. In this example, the Ethernet frame 200 includes fields such as a Preamble 201, a Start of Frame Delimiter (SOF) 202, Destination MAC Address 203, Source MAC address 204, Length 205, Type (Ethertype) 206, Payload 207, and Frame Check Sequence (for example, cyclic redundancy code or cyclic redundancy check) 208. In one embodiment, the Preamble is 7 bytes, the SOF is 1 byte, the Destination MAC address is 6 bytes, the Length is 2 bytes, the Type is 2 bytes, the Payload is 46-1500 bytes, and the Frame Check Sequence is 4 bytes. These fields are not limited to the above listed bytes and may have more or less bytes than listed. In one embodiment, the Preamble 201 allows devices on the network to detect a new incoming Ethernet frame. In another embodiment, the Preamble 201 may not be used. In one embodiment, the SOF 202 marks the end of the Preamble. In one embodiment, the Destination MAC address 203 is the address of the receiving device, while the Source MAC address 204 is the address of the sending device. In one embodiment, the Length 205 may be used to indicate which protocol, such as PCIe, is encapsulated in the payload of the Ethernet frame. In one embodiment, the Type 206 may be used to indicate which protocol, such as PCIe, is encapsulated in the payload of the Ethernet frame. The Type 206 may indicate a PCIe protocol through a PCIe control frame ID sequence. Length 205 and Type 206 are just an example of where a protocol indicator or tag may be stored. The protocol indicator may be located in another field. In one embodiment, the Payload 207 is used to store PCIe data. In one embodiment, the Frame Check Sequence 208 may be used to detect accidental changes in the packet, for example the header, payload, the Frame Check Sequence itself, etc.

Figure 3:
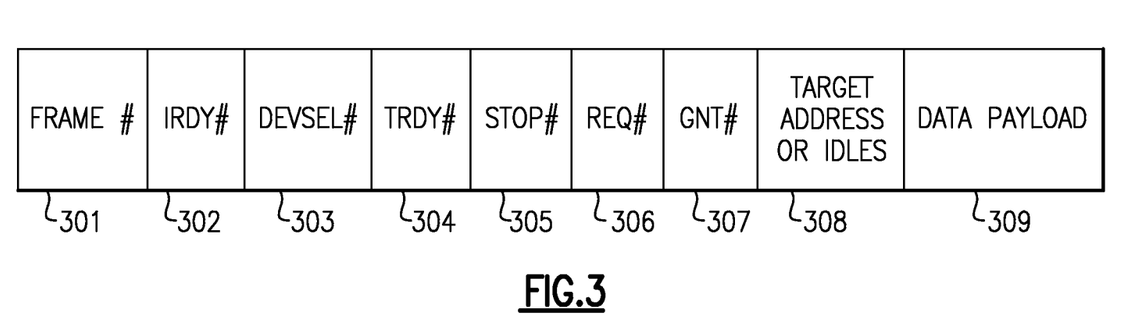
FIG. 3 illustrates one embodiment of a lossless Ethernet Frame Payload in accordance with one or more aspects of the present invention.

One embodiment of a lossless Ethernet frame payload in accordance with one or more aspects of the present invention is described with reference to FIG. 3. In this example, the lossless Ethernet frame payload further elaborates on the Payload 207 of FIG. 2. The lossless Ethernet Frame Payload may include fields such as FRAME#301, IRDY#302, DEVSEL#303, TRDY#304, STOP#305, REQ#306, GNT#307, Target Address or Idles 308, and Data Payload 309. FRAME#301, IRDY#302, DEVSEL#303, TRDY#304, STOP#305 correspond to the main control signals in PCIe. REQ#306 corresponds to a bus request signal. The GNT#307 corresponds to the grant signal from an arbiter. The Target Address or Idles 308 corresponds to either the target device address or an indication showing that the bus is idle. The Data Payload 309 may contain a command associated with the target, a delay frame, or other information to be transferred.

Five main control signals drive PCIe bus transactions. The initiator of the transaction drives two of the main control signals: FRAME# and IRDY#. The target of the transaction drives three of the main control signals: DEVSEL#, TRDY#, and STOP#. FRAME#, which is asserted by the initiator of the transaction, may be used to start a timer which counts clock cycles as part of a programmable latency circuit. IRDY#, which is asserted by the initiator of the transaction, may be used to indicate that a data phase transaction is complete. DEVSEL#, which is asserted by the target of the transaction, may be used for the following condition: if a target device examines the PCIe address and determines that it is the intended target, then it asserts DEVSEL# within a maximum of three clock cycles. TRDY#, which is asserted by the target of the transaction, may be asserted within 16 cycles of starting a transaction to indicate that the transaction is complete and the target is ready for the next step. STOP#, which is asserted by the target of the transaction, may be asserted instead of TRDY# to abort a transaction on the PCIe bus.

In additional to the five main control signals in the PCIe bus stated above, there are two additional arbitration signals, REQ# and GNT#. Any device on a PCIe bus that is capable of initiating transactions, for example capable of acting as a bus master, may initiate a transaction with any other device. Each device has a separate request line and may transmit a request signal, such as REQ#, which is sent to an arbiter to request access to the bus. The arbiter may be located on the motherboard and may be used to grant device access to the bus. To ensure that only one transaction is initiated at a time, each initiating device must first wait for a bus grant signal, such as GNT#, from the arbiter. The GNT# signal signifies that the requesting device is now allowed to use the bus. The arbiter may either provide or remove the GNT# signal at any time. By controlling this signal, the arbiter insures that only one transaction is active on the bus at a time. The arbiter may leave or assign the GNT# signal on a device attached to the bus even if no device on the bus is requesting access. This is also known as "parking" the GNT# signal.

All of the five main control signals, FRAME#, IRDY#, DEVSEL#, TRDY#, and STOP#, and the two additional arbitration signals, REQ# and GNT#, may be active low, meaning that the active or asserted state is a low voltage. Thus, in one embodiment, when a device is asserting a control signal, the asserted state is a low voltage. In this embodiment, all devices drive the signals high for one cycle before ceasing to drive the signals. This is performed to be consistent with PCIe standard conventions, which state that a signal high must be held for one cycle before ceasing to drive it. In another embodiment, the control signals may be an active high, meaning that the active or asserted state is a high voltage.

All of the PCIe bus signals may be sampled on the rising edge of the clock. Signals change on the falling edge of the clock. This allows each PCIe device approximately one half a clock cycle to decide how to respond to the signals that may be observed on the rising edge of the clock, and one half a clock cycle to transmit a response to the other device. When a device driving a PCIe bus signal changes, one turnaround cycle must elapse between the time the one device stops driving the signal and the other device starts. This turnaround cycle is used to prevent the situation where multiple devices try to drive the signal at the same time, which would interfere with bus operation.

For PCIe, each of the main control lines must be high for a minimum of two cycles when changing devices or owners. This is due to the turnaround cycle and the requirement to drive a control line high for one cycle as stated above. The two minimum cycles are also known as the idle cycle. In some situations, the idle cycle may be skipped, for example in fast back-to-back transactions. For these situations, it may be necessary to insert a delay to help synchronize the sending device and the receiving device, so that the receiving device will sample the transaction signal at the correct point. The fast back-to-back transaction refers to a situation where it may be necessary to skip the idle cycle between PCIe bus transactions, going directly from the final cycle of one transaction to the first cycle of the next transaction. An initiator may only initiate a back-to-back transaction when the transaction is by the same initiator, the first transaction was a write, and the initiator still has permission to use the PCIe bus.

A PCIe bus transaction begins with an address phase. The initiator or initiating device, seeing that it has received a GNT# from the arbiter and that the bus is idle, may drive a target address onto the AD[31:0] lines, the associated command (for example memory read or I/O write) on the C/BE [3:0]# lines, and drives FRAME# to a low. In one embodiment, the PCIe bus is attached to an expansion adapter card on the computer system, such as the NIC and would drive the lines to the NIC. In one embodiment, the initiator detects that the bus is idle when FRAME# and IRDY# are both deasserted. Each other device connected to the computer system, whether through the PCIe bus or through a CEE network, may examine the target address and command and decide whether it is the appropriate target device corresponding to the target address. Each target device knows its own address and will be able to use its own address to make the comparison. Specifics as to how this is communicated with the devices or systems connected through the CEE network and not through the PCIe backplane of the initiating device will be described subsequently in the paragraphs below. If one of the devices decides it is the appropriate target device corresponding to the target address, that device will respond as the target by asserting DEVSEL#. That device may respond by asserting DEVSEL# within 3 cycles. Devices which promise to respond within 1 or 2 cycles are said to have "fast DEVSEL" or "medium DEVSEL", respectively. On the sixth cycle, if there has been no response, the initiator may initiate a master abort termination. This will abort the transaction by deasserting FRAME#. In this situation, a PCIe bus bridge may return all-ones data (0xFFFFFFFF), for example returned in place of the requested data payload.

Figure 4:
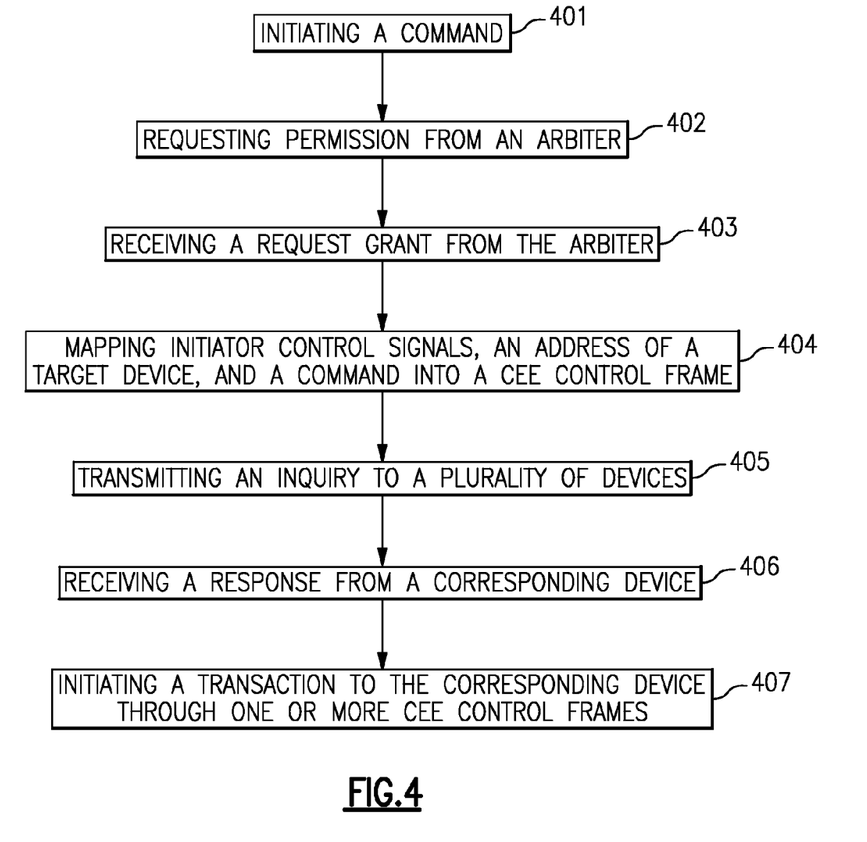
FIG. 4 illustrates one embodiment of a process in accordance with one or more aspects of the present invention.

One embodiment of a process in accordance with one or more aspects of the present invention is described in reference to FIG. 4. An initiating device initiates a command associated with a target device, 401. This may be a read or write command. The command may be associated with initiator control signals (for example FRAME# which starts the timer and IRDY# which indicates when the transaction is complete). These control signals (FRAME# and IRDY#) may be driven by the initiating device and are asserted as appropriate. The initiating device requests permission from an arbiter, 402, for example through a REQ# signal sent to the arbiter. The arbiter receives the REQ# signal and checks to see if the bus, such as a PCIe bus, is currently in use by another device. If the bus is free, then the arbiter transmits a GNT# signal back to the initiating device, thus granting the initiating device use of the bus. The initiating device receives the request grant from the arbiter, 403, and may check to see if the PCIe bus is idle. Once it is determined that the bus is available, the initiating device maps, though the use of a mapping device for example a NIC, the initiator control signals (ex: FRAME# and IRDY#), an address of a target device, and a command into a CEE frame, 404. In one embodiment, the Type field in the CEE frame is populated with a PCIe control frame ID sequence. In one embodiment, the mapping device may also map a delay frame, and arbitration signals such as the request signal (for example, REQ#) and the grant request signal (for example, GNT#) into the CEE frame. The REQ# and GTN# may be stored in the CEE in order to mimic the behavior of a locally attached PCIe peripheral on the bus. The delay frame may be mapped through the insertion of CEE idle characters into the payload of the CEE frame. The delay frame and the CEE idle characters may represent the delay that is needed to meet the turnaround cycle and the requirement to drive a control line high for one cycle.

The initiating device only knows the address of a target device at this point, as the command is associated with a target device. It is unaware of which device in the network is actually the one associated with that address. Thus, a handshake may be initiated by the initiating device to determine which device in the plurality of (one or more) devices in the system correspond to the address of the target device. An inquiry is transmitted by the initiating device to a plurality of devices, 405. For example, the plurality of devices may be connected to the same network as the initiating device (such as a PCIe bus) or they may be connected through a different network (such as a CEE network). When communicating with a device or system over a CEE network, a CEE frame mapped with the information previously stated above is used. For the purposes of this example, let's say that a corresponding device is located over a CEE network and is the appropriate target device. This corresponding device may be apart of a system, for example second computer system 103 of FIG. 1, and may be connected to a PCIe backplane in the second computer system 103. The corresponding device receives the inquiry, extracts the necessary information from the various CEE frame fields, such as through its own mapping device, for example a NIC, and checks to see if the address of the target device matches its own address. If the addresses match, the corresponding device transmits a response back to the initiating device. This response notifies the initiating device that the corresponding device is the one the initiating device is looking for, i.e. the corresponding device corresponds to the address of the target device. The initiating device receives the response, 406. The response may be received through a CEE frame and may be comprised of one or more target control signals that are driven by the corresponding device, for example DEVSEL#, TRDY#, and STOP#. In one embodiment, even if TRDY# and STOP# are not necessarily asserted by the corresponding device at that time, they may still be mapped in the response CEE frame. Once the initiating device is notified, for example DEVSEL# is asserted in the response, the initiating device initiates a transaction to the corresponding device, 407. The initiating device will start transmitting CEE data frames or will start receiving CEE data frames containing the data to be read or written, depending on the transaction command, such as a read or a write. In one embodiment, the transaction may be a read or a write to cache memory, where the cache memory may be used to buffer incoming data frames on a server or switch for subsequent processing. In one embodiment, the read or write may require multiple CEE control frames to be sent either from the initiating device, the corresponding device, or a combination thereof.

In one embodiment, the Destination MAC address field is used to route the CEE frame to the appropriate destination, for example a NIC at the initiating device or the target device. The Destination MAC address is known by the initiating device through a lookup table which contains a list of all the devices attached to the network. In this way, the initiating device knows the network topology. Thus it knows which types of devices are attached at various points on the network.

In one embodiment, the corresponding device, which is connected over a CEE network, may also map control signals into any CEE frames that is to be sent back to the initiating device. The mapping may be performed by a mapping device, such as a NIC. The mapping may be similar to the mapping performed by the initiating device. The control signals that are mapped may include DEVSEL#, TRDY#, and STOP#. Additional data to be transferred may also be mapped.

In one embodiment, the fields of an Ethernet Frame Payload, once known by the initiator or target device, may be mapped to include all known fields in subsequent CEE frames sent across a CEE network, regardless of who drives or asserts those fields.

In one embodiment, the Preamble, SOF, Destination MAC Address, Source MAC address, Length, and Frame Check Sequence fields in the Ethernet frame may be populated as is known in the art for a standard Ethernet Frame.

In one embodiment, a device receiving a CEE frame may, through a mapping device such as a NIC, extract the appropriate fields from the CEE frame for use on a PCIe bus backplane.

Figure 5A:
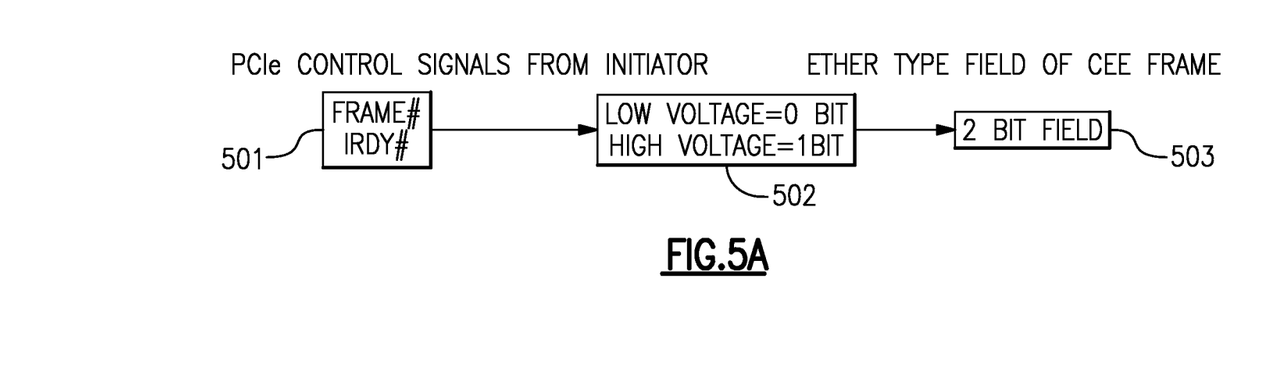
FIG. 5A illustrates one embodiment of a process for mapping PCIe control signals from an initiator into a CEE control frame in accordance with one or more aspects of the present invention.

One embodiment of a process for mapping PCIe control signals from an initiator into a CEE control frame in accordance with one or more aspects of the present invention is described in reference to FIG. 5A. The FRAME# and IRDY# control signals from the initiator, 501, may be a low voltage or a high voltage. A low voltage may be mapped as a 0 bit. A high voltage may be mapped as a 1 bit, 502. This mapping may be stored into a 2 bit field, 503. This 2 bit field may correspond to the FRAME#301 and IRDY#302 fields as described in FIG. 3.

Figure 5B:
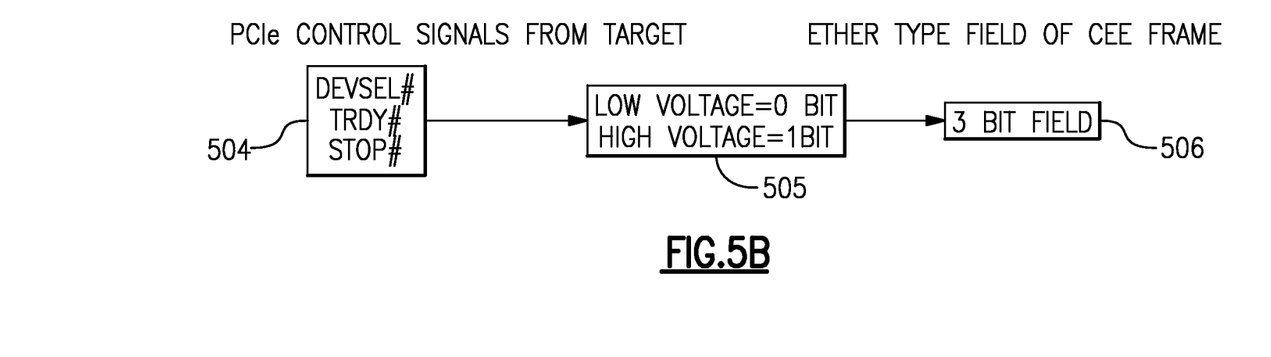
FIG. 5B illustrates one embodiment of a process for mapping PCIe control signals from a target into a CEE control frame in accordance with one or more aspects of the present invention.

One embodiment of a process for mapping PCIe control signals from a target into a CEE control frame in accordance with one or more aspects of the present invention is described in reference to FIG. 5B. The DEVSEL#, TRDY#, and STOP# control signals from the target, 504, may be a low voltage or a high voltage. A low voltage may be mapped as a 0 bit. A high voltage may be mapped as a 1 bit, 505. This mapping may be stored into a 3 bit field, 504. This 3 bit field may correspond to the DEVSEL#303, TRDY#304, and STOP#305 fields as described in FIG. 3.

Figure 6:
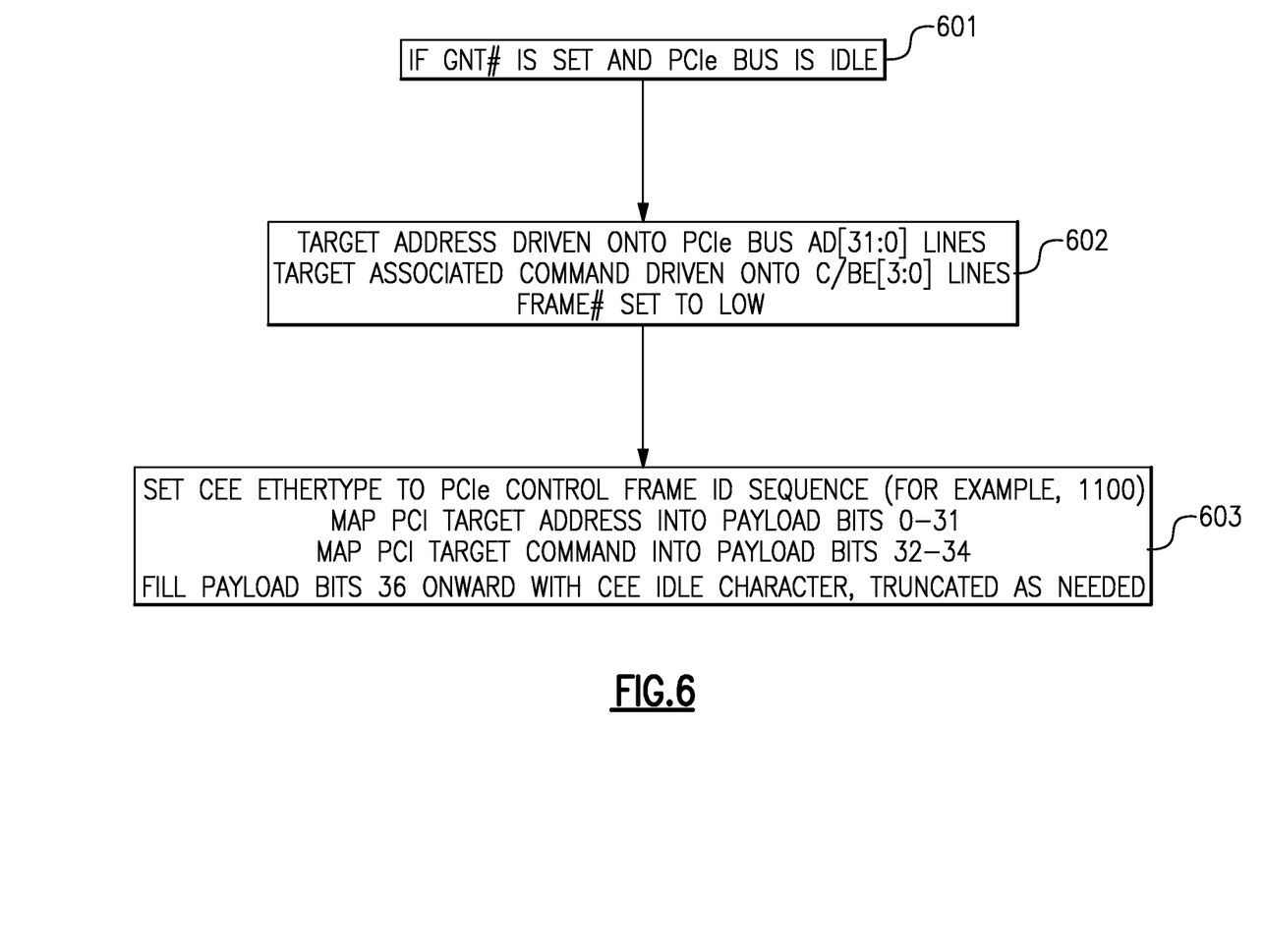
FIG. 6 illustrates one embodiment of a process for mapping PCIe target addresses and commands into a CEE control frame in accordance with one or more aspects of the present invention.

One embodiment of a process for the mapping of PCIe target addresses and commands into a CEE control frame when a command is initiated by an initiating device in accordance with one or more aspects of the present invention is described in reference to FIG. 6. If the grant request signal, for example GNT#, is asserted by the arbiter, received by the initiator, and the PCIe bus is idle, 601, then the target address and the target associated command may be driven onto the PCIe bus. Also, the FRAME# may be asserted, i.e. set to low, 602. For example, the initiator may consider the bus to be idle when FRAME# and IRDY# are both deasserted. In one embodiment, there may be an idle sequence that may be stored in the Lossless Ethernet Payload to indicate that the bus is idle. In one embodiment, the target address may be driven onto PCIe bus AD [31:0] lines and the command associated with the target device may be driven onto PCIe bus C/BE[3:0] lines, 602. In one embodiment, the Ethertype field in the CEE control frame may be set to a PCIe control frame ID sequence, for example an ID sequence may look like: 1100, where the Ethertype may be comprised of 2 bytes, the first byte being all 1s and the second byte being all 0s to designate a PCIe mapping. This allows the CEE control frame to indicate that the CEE control frame designates a PCIe mapping, i.e. contains PCIe information. The PCIe control frame ID sequence may be unique to each device. There may be multiple ways to designate in the Ethertype field that the CEE frame indicates PCIe information than that listed above. In one embodiment, the FRAME# signal is asserted, 602, to start the timer. The timer allows a specified interval for the transaction to complete, otherwise it is declared to have timed out and the transaction is stopped. The PCIe target address may be mapped into the payload of the CEE control frame, for example into payload bits 0-31, 603. The PCIe target command may be mapped into the payload of the CEE control frame, for example payload bits 32-34, 603. If there is no data to be transferred yet in conjunction to the command, an idle frame may fill up the remaining payload field. For example, payload bits 36 and onward may be filled with CEE idle characters and truncated as needed, 603.

Figure 7:
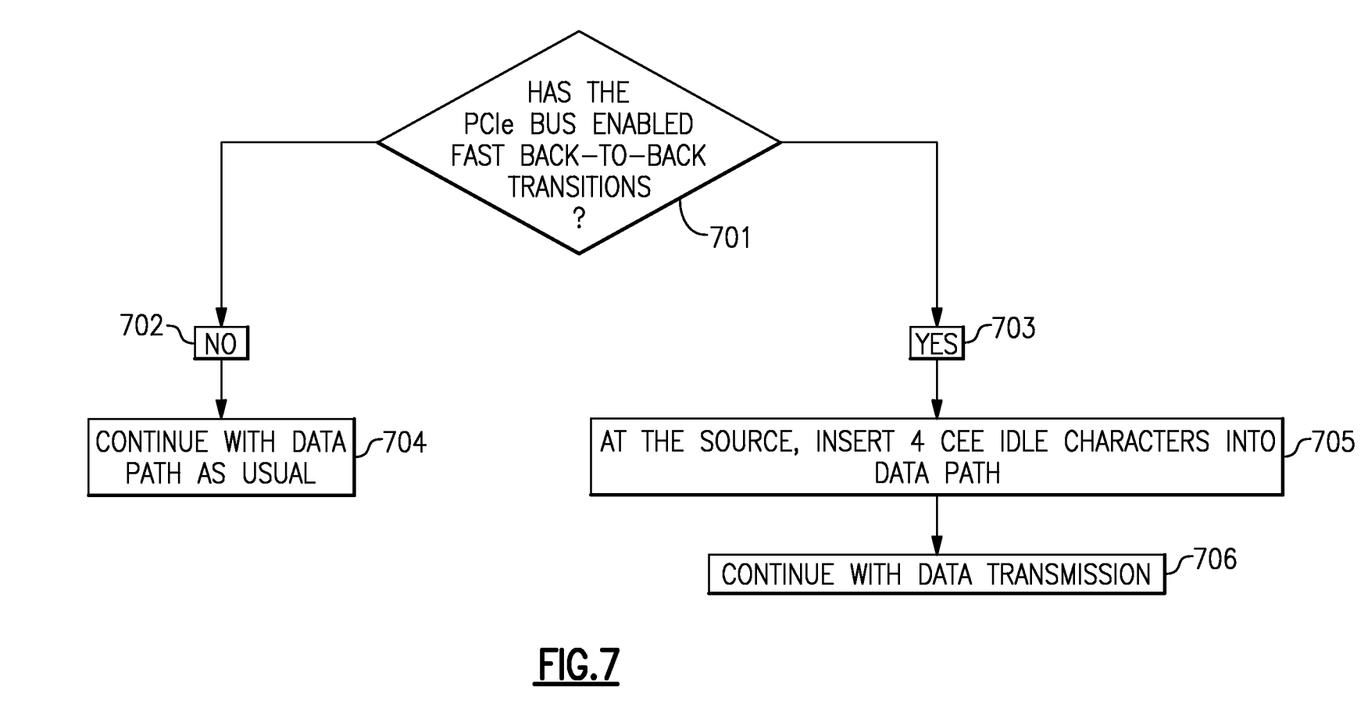
FIG. 7 illustrates one embodiment of a process for enabling flow control at the data source when PCIe back to back transitions are enabled in accordance with one or more aspects of the present invention.

One embodiment of a process for enabling flow control at the data source when PCIe back to back transitions are enabled and communications go through CEE frames in accordance with one or more aspects of the present invention is described in reference to FIG. 7. The data source may be the initiator if the command is a write, or it may be the target device if the command is a read. The data source checks to see if the PCIe bus has enabled fast back-to-back transactions, 701, for example checking to make sure that it's the same initiator, the first transaction is a write, and that the initiator still has permission. If no, 702, then the data source will continue as usual data path, 704. If yes, 703, then at the data source, idle characters may be inserted into the PCIe link, for example 4 CEE idle characters. In one embodiment, CEE idle characters are only used during the initial handshake. In one embodiment 4 CEE idle characters may be used to mimic the behavior of a locally attached PCIe peripheral device. In another embodiment, a different number of CEE idle characters may be used. After the CEE idle characters are inserted, normal data transmission is continued.

Figure 8:
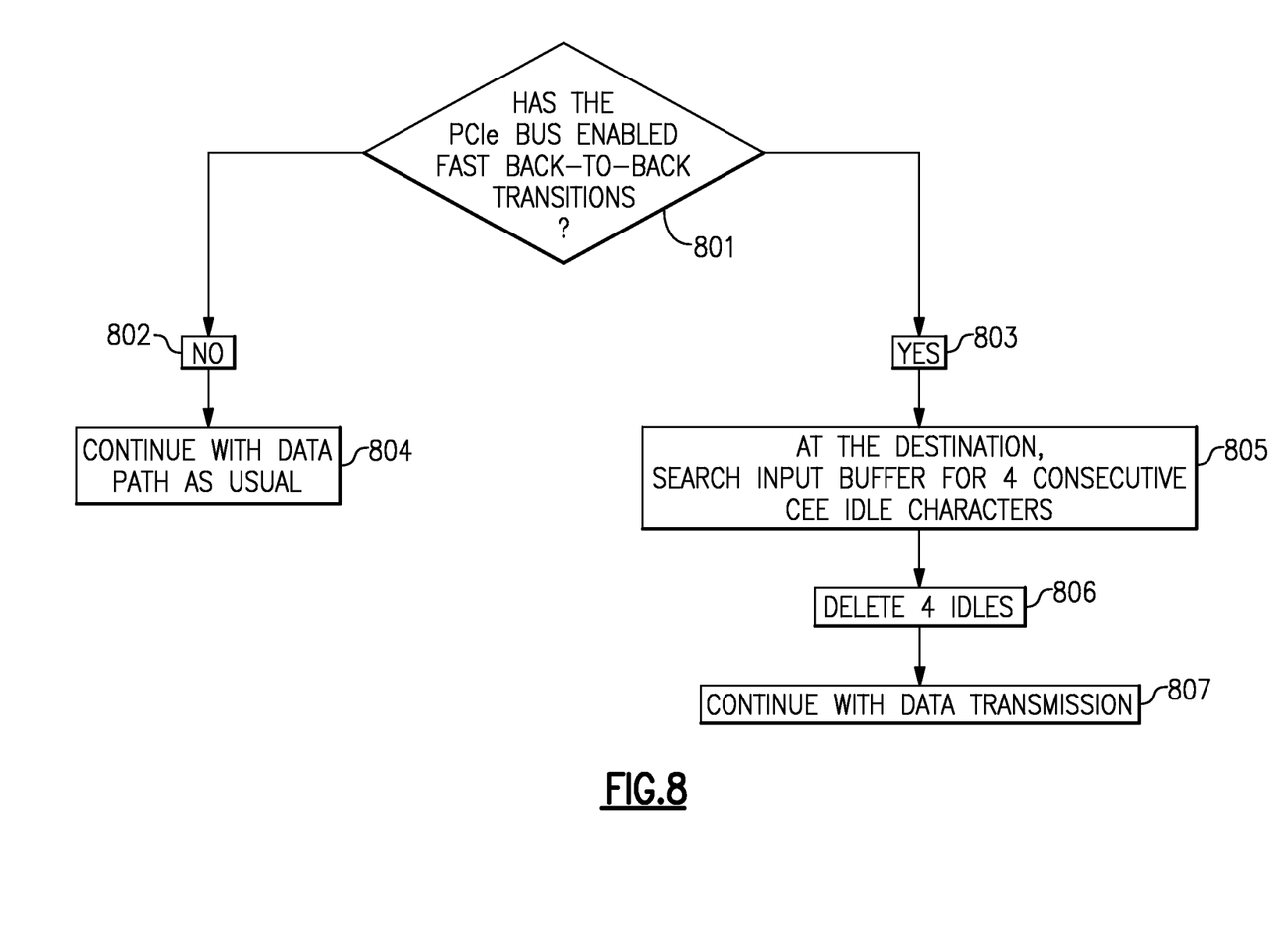
FIG. 8 illustrates one embodiment of a process for enabling flow control at the destination source when PCIe back to back transitions are enabled in accordance with one or more aspects of the present invention.

One embodiment of a process for enabling flow control at the destination source when PCIe back to back transitions are enabled in accordance with one or more aspects of the present invention is described in reference to FIG. 8. The destination may be the target device if the command is a write, or it may be the initiator if the command is a read. The destination checks to see if the PCIe bus has enabled fast back-to-back transactions, 801, for example checking to make sure that it's the same initiator, the first transaction is a write, and that the initiator still has permission. If no, 802, then the initiator will continue as usual data path, 804. If yes, 803, then at the destination, incoming CEE frames, which may be held in an input buffer associated with the destination, may be searched for consecutive idle characters, for example 4 consecutive CEE idle characters, 805. When they are found, the idle characters may be deleted, 806. After which, normal data transmission may be continued, 807.

In one embodiment, there may be long distance clustering applications on the systems. In this situation, there may be many devices attached to a computer system, such as shown for the first computer system 101 of FIG. 1. One of the devices may provide long distance extensions. Hence any distance longer than the normal PCIe distance would be considered a long distance extension. In one embodiment, normal PCIe distance may be 3 meters. When the arbiter receives a request signal from a long distance extension device, after the arbiter decides to send a grant signal, it may permanently park the grant signal on that long distance extension device. In other words, the arbiter may be instructed to leave the bus grant signal on this one device while long distance transactions are taking place. In one embodiment, the long distance extension device may send a control signal to the arbiter. This control signal may instruct the arbiter to assign and leave the grant signal for the long distance extension device and to deny grant permissions to other devices for the duration of the long distance transaction. So in one embodiment, two control signals may be sent, the REQ# and this other control signal. In this situation, extra time may be allowed to take into account the latency of devices attached at extended distances.

In one embodiment, a master abort may be permanently avoided when dealing with a transaction. For example, the system may be configured to never allow the bus to return all-ones data over the PCIe bus. This may be done by inspecting all incoming data packet contents, for example the CEE data frames for a deasserted FRAME#. If an incoming CEE frame has a master abort, the receiving device may disregard that control signal when extracting information for PCIe bus use. If during mapping of the PCIe control signals and other fields into a CEE frame, the mapping device discovers that payload where the requested data usually resides contains all-ones data, that packet may be discarded.

In one embodiment, when there is a CEE extension, an extension of the CEE link into the PCIe bus, the target device will permanently assert DEVSEL# to always latch onto the first cycle. The CEE extension refers to anything longer than the normal CEE link length. In one embodiment the normal CEE link length is 10 meters on copper. This forces the PCIe bus to always latch data on the first cycle, so that when there is an extended distance link, data can be latched on as soon as it is returned following a long idle sequence.

In one embodiment, instead of a PCIe bus and PCIe devices, a Peripheral Component Interconnect (PCI) bus with PCI devices may be utilized in the backplanes of the initiating side and the target side. Similarly, any PCI specific signals and commands may be used instead of the PCIe specific signals and commands.

As will be appreciated by one skilled in the art, the embodiments may be embodied as a system, method or computer program product. Accordingly, the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiment may take the form of a computer program product embodied in any tangible medium of expression having computer usable program code embodied in the medium.

Figure 9:
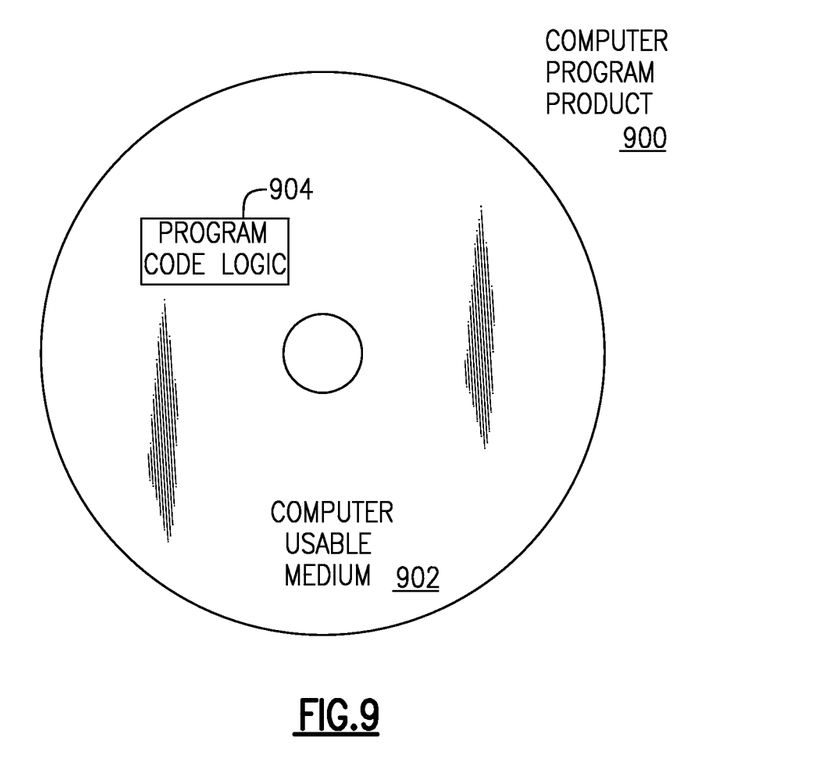
FIG. 9 illustrates one embodiment of a computer program product to incorporate one or more aspects of the present invention.

One example of a computer program product incorporating one or more aspects of an embodiment is described with reference to FIG. 9. A computer program product 900 includes, for instance, one or more computer usable media 902 to store computer readable program code means or logic 904 thereon to provide and facilitate one or more aspects of an embodiment. Any combination of one or more computer usable or computer readable medium(s) may be utilized. The computer-usable or computer-readable medium may be, for example but not limited to, an electronic, magnetic, optical, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable medium may be any storage medium that can contain or store the program for use by or in connection with the instruction execution system, apparatus, or device.

Computer program code for carrying out operations of the embodiment may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 10:
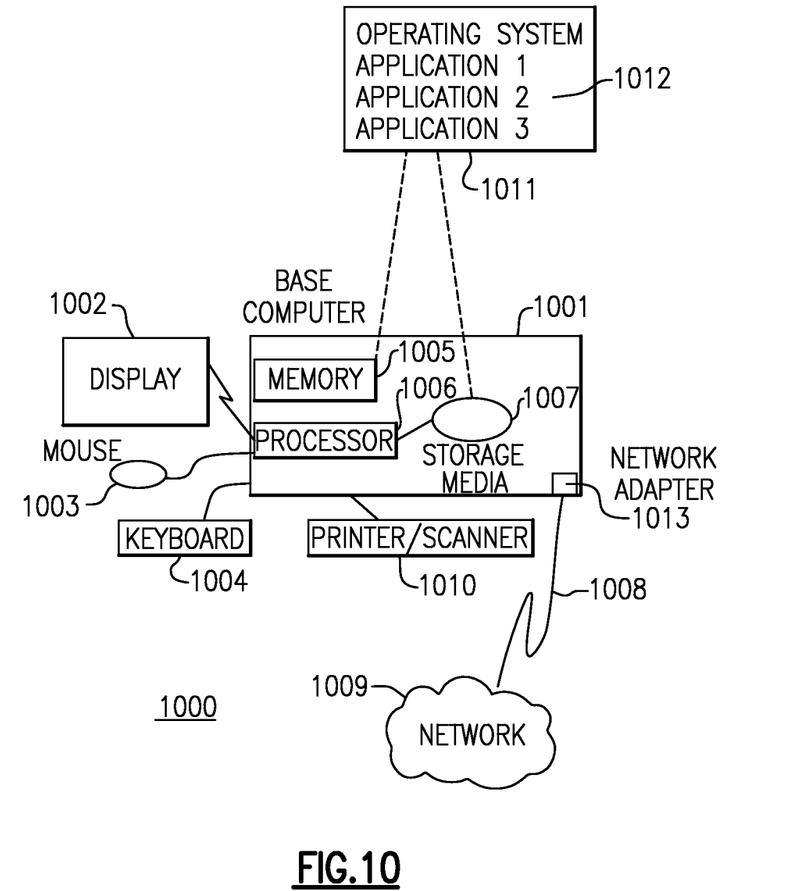
FIG. 10 illustrates one embodiment of a computer system in which an embodiment of the present invention may be practiced.

FIG. 10 illustrates an embodiment of a workstation, server hardware system, in which an embodiment may be practiced. The system comprises a computer system 1001, such as a personal computer, a workstation, a server, a storage device, or host, including optional peripheral devices. The computer system 1001 includes one or more processors 1006 and a bus employed to connect and enable communication between the processor(s) 1006 and the other components of the computer system 1001 in accordance with known techniques. The bus connects the processor 1006 to memory 1005 and long-term storage 1007 which can include a hard drive (including any of magnetic media, CD, DVD and Flash Memory for example) or a tape drive for example. The computer system 1001 might also include a user interface adapter, which connects the microprocessor 1006 via the bus to one or more interface devices, such as a keyboard 1004, mouse 1003, a printer/scanner 1010 and/or other interface devices, which can be any user interface device, such as a touch sensitive screen, digitized entry pad, etc. The bus also connects a display device 1002, such as an LCD screen or monitor, to the microprocessor 1006 via a display adapter.

The computer system 1001 may communicate with other computers or networks of computers by way of a network adapter 1013, for example a network interface controller (NIC), capable of communicating 1008 with a network 1009. For example, network adapters may include communications channels, token ring, Ethernet or modems. Alternatively, the computer system 1001 may communicate using a wireless interface, such as a CDPD (cellular digital packet data) card. The computer system 1001 may be associated with such other computers in a Local Area Network (LAN), VLAN, or a Wide Area Network (WAN), or the computer system 1001 may be a client in a client/server arrangement with another computer, etc. All of these configurations, as well as the appropriate communications hardware and software, are known in the art.

Software programming code which embodies an embodiment may be typically accessed by the processor 1006 from long-term storage media 1007. The software programming code may be embodied on any of a variety of known media for use with a data processing system, as previously described above with reference to FIG. 9. The code may be distributed on such media, or may be distributed to users from the memory or storage of one computer system over a network to other computer systems.

Alternatively, the programming code 1011 may be embodied in the memory 1005, and accessed by the processor 1006 using the processor bus. Such programming code may include an operating system which controls the function and interaction of the various computer components and one or more application programs 1012. Program code may be normally paged from storage media 1007 to memory 1005 where it may be available for processing by the processor 1006. The techniques and methods for embodying software programming code in memory, on physical media, and/or distributing software code via networks are well known and will not be further discussed herein. The computer program product medium may be typically readable by a processing circuit preferably in a computer system for execution by the processing circuit.

The flow diagrams depicted herein are just examples. There may be many variations to these diagrams or the steps (or operations) described therein without departing from the spirit of the embodiment. For instance, the steps may be performed in a differing order, or steps may be added, deleted or modified. All of these variations are considered a part of the claimed embodiment.

While the preferred embodiment has been described, it will be understood that those skilled in the art, both now and in the future, may make various improvements and enhancements which fall within the scope of the claims which follow.

What is claimed is:

1. A computer system comprising:
a memory;
an initiating device in communication with a processor;
said processor in communication with said memory, said processor comprising an instruction fetching unit for fetching instructions from memory and one or more execution units for executing fetched instructions;
wherein said computer system is capable of performing a method comprising:
   initiating a command, said command associated with one or more initiator control signals, said one or more initiator control signals associated with said initiating device;
   requesting permission from an arbiter;
   receiving a request grant from said arbiter;
   based on said request grant, mapping said one or more initiator control signals, an address of a target device, and said command into a Converged Enhanced Ethernet (CEE) control frame;
   based on said mapping, transmitting an inquiry to one or more devices;
   based on transmitting said inquiry, receiving a response from a corresponding device from said one or more devices, said corresponding device being associated with said address of said target device, said response comprising one or more target control signals associated with said corresponding device;
   based on said response, initiating a transaction to said corresponding device through one or more of said CEE control frames.

2. The computer system according to claim 1, wherein initiating, by said initiating device, a transaction further comprises:

based on said command being a write command, transmitting, by said initiating device, one or more write command associated CEE control frames to said corresponding device, said one or more write command associated CEE control frames comprising data corresponding to said write command; and based on said command being a read command, receiving, by said initiating device, one or more read command associated CEE control frames from said corresponding device, said one or more read command associated CEE control frames comprising data corresponding to said read command.

3. The computer system according to claim 1, wherein initiating, by said initiating device, a transaction further comprises:

based on said command being a read command, transmitting, by said corresponding device, one or more read command associated CEE control frames to said initiating device, said one or more read command associated CEE control frames comprising data corresponding to said read command; and based on said command being a write command, receiving, by said corresponding device, one or more write command associated CEE control frames from said initiating device, said one or more write command associated CEE control frames comprising data corresponding to said write command.

4. The computer system according to claim 1, further comprising:

receiving, by a receiving device from said one or more devices, said inquiry, said inquiry comprising said address of said target device;

based on said inquiry, checking, by said receiving device, to see if said receiving device is associated with said address of said target device;

based on said receiving device being associated with said address of said target device, transmitting, by said receiving device, said response to said initiating device, wherein said receiving device is said corresponding device.

5. The computer system according to claim 1, wherein mapping, by a mapping device associated with said initiating device, said one or more initiator control signals, an address of a target device, and said command into a CEE control frame further comprises:

mapping a delay and a request signal into said CEE control frame.

6. The computer system according to claim 1, wherein said CEE control frame comprises a header and a payload, said header identifying said CEE control frame as PCIe, said payload comprising control signal fields corresponding to said initiator control signals, arbitration signals, and target control signals.

7. The system according to claim 1, wherein said mapping is performed by a mapping device associated with said corresponding device, said mapping device configured to:

map PCIe control signals associated with said corresponding device, data associated with said corresponding device, or a combination thereof into a CEE frame; and transmit said CEE frame to said initiating device.

8. A computer program product, the computer program product comprising:

a non-transitory storage medium readable by a processing circuit and storing instructions for execution by the processing circuit for performing a method comprising:

initiating a command, said command associated with one or more initiator control signals, said one or more initiator control signals associated with an initiating device;

requesting permission from an arbiter;

receiving a request grant from said arbiter;

based on said request grant, mapping said one or more initiator control signals, an address of a target device, and said command into a Converged Enhanced Ethernet (CEE) control frame;

based on said mapping, transmitting an inquiry to one or more devices;

based on transmitting said inquiry, receiving a response from a corresponding device from said one or more devices, said corresponding device being associated with said address of said target device, said response comprising one or more target control signals associated with said corresponding device;

based on said response, initiating a transaction to said corresponding device through one or more of said CEE control frames.

9. The computer program product according to claim 8, wherein initiating a transaction further comprises:

based on said command being a write command, transmitting one or more write command associated CEE control frames to said corresponding device, said one or more write command associated CEE control frames comprising data corresponding to said write command; and based on said command being a read command, receiving one or more read command associated CEE control frames from said corresponding device, said one or more read command associated CEE control frames comprising data corresponding to said read command.

10. The computer program product according to claim 8, wherein initiating a transaction further comprises:

based on said command being a read command, transmitting, by said corresponding device, one or more read command associated CEE control frames to said initiating device, said one or more read command associated CEE control frames comprising data corresponding to said read command; and based on said command being a write command, receiving, by said corresponding device, one or more write command associated CEE control frames from said initiating device, said one or more write command associated CEE control frames comprising data corresponding to said write command.

11. The computer program product according to claim 8, further comprising:

receiving, by a receiving device from said one or more devices, said inquiry, said inquiry comprising said address of said target device;

based on said inquiry, checking, by said receiving device, to see if said receiving device is associated with said address of said target device;

based on said receiving device being associated with said address of said target device, transmitting, by said receiving device, said response to said initiating device, wherein said receiving device is said corresponding device.

12. The computer program product according to claim 8, wherein mapping said one or more initiator control signals, an address of a target device, and said command into a CEE control frame further comprises:

mapping a delay and a request signal into said CEE control frame.

13. The computer program product according to claim 8, wherein said CEE control frame comprises a header and a payload, said header identifying said CEE control frame as PCIe, said payload comprising control signal fields corresponding to said initiator control signals, arbitration signals, and target control signals.

14. The computer program product according to claim 8, mapping is performed by a mapping device associated with said corresponding device, said mapping device configured to:
   map PCIe control signals associated with said corresponding device, data associated with said corresponding device, or a combination thereof into a CEE frame; and
   transmit said CEE frame to said initiating device.

* * * * *